(12) United States Patent
Metzger et al.

(10) Patent No.: US 9,347,554 B2
(45) Date of Patent: May 24, 2016

(54) HYDROSTATIC DRIVE SYSTEM

(71) Applicant: Caterpillar Inc., Peoria, IL (US)

(72) Inventors: Rustin G. Metzger, Congerville, IL (US); Carl Moberg, Dunlap, IL (US); Corwin E. Storer, Bartonville, IL (US); Paul A. Dvorak, Hanna City, IL (US)

(73) Assignee: Caterpillar Inc., Peoria, IL (US)

( * ) Notice: Subject to any disclaimer, the term of this patent is extended or adjusted under 35 U.S.C. 154(b) by 556 days.

(21) Appl. No.: 13/802,867

(22) Filed: Mar. 14, 2013

(65) Prior Publication Data

US 2014/0260221 A1 Sep. 18, 2014

(51) Int. Cl.
*F16H 61/46* (2010.01)
*F16H 61/421* (2010.01)
*F16H 61/431* (2010.01)
*F16H 61/47* (2010.01)

(52) U.S. Cl.
CPC .............. *F16H 61/46* (2013.01); *F16H 61/421* (2013.01); *F16H 61/431* (2013.01); *F16H 61/47* (2013.01)

(58) Field of Classification Search
CPC ....... F16H 61/42; F16H 61/47; F16H 61/421; F16H 61/431
USPC ..................... 60/465, 490, 491, 492
See application file for complete search history.

(56) References Cited

U.S. PATENT DOCUMENTS

| | | | | |
|---|---|---|---|---|
| 3,271,955 A * | 9/1966 | Holzbock | ........... | F16H 61/4157 60/393 |
| 3,319,419 A * | 5/1967 | Hann | ...................... | F16H 61/46 417/218 |
| 4,766,779 A * | 8/1988 | Massy | ...................... | F16H 47/02 475/83 |
| 4,848,186 A | 7/1989 | Dorgan et al. | | |
| 4,932,502 A * | 6/1990 | Blain | ...................... | B66B 1/285 187/286 |
| 5,678,463 A | 10/1997 | Brambilla et al. | | |
| 6,272,950 B1 * | 8/2001 | Braun | ...................... | F16H 47/02 74/731.1 |
| 7,354,368 B2 | 4/2008 | Pollman | | |
| 7,390,282 B2 | 6/2008 | Shah | | |
| 8,312,716 B2 * | 11/2012 | Deeken | .................. | F04B 49/002 60/414 |
| 2006/0230920 A1 * | 10/2006 | Berg | ...................... | F16H 61/472 91/499 |
| 2009/0145122 A1 * | 6/2009 | Deeken | .................. | F04B 49/002 60/451 |
| 2011/0178684 A1 * | 7/2011 | Umemoto | ............... | F16H 61/421 701/51 |
| 2014/0311463 A1 * | 10/2014 | Hayashi | .................. | F02B 39/08 123/561 |

FOREIGN PATENT DOCUMENTS

EP 1008785 6/2000

* cited by examiner

*Primary Examiner* — Nathaniel Wiehe
*Assistant Examiner* — Matthew Wiblin
(74) *Attorney, Agent, or Firm* — Daniel Spillman

(57) ABSTRACT

A hydrostatic drive system for a machine is disclosed. The hydrostatic drive system includes a pump, a hydraulic motor configured to receive a pressurized fluid from the pump and a controller operably connected to the pump and the hydraulic motor. The controller is configured to receive an input signal indicative of a current machine speed and a desired machine speed. Further, the controller is configured to output a motor displacement command signal and a pump displacement command signal to adjust a displacement of the hydraulic motor and the pump respectively based on the input signal to maintain at least one of constant machine speed or constant acceleration or constant deceleration during adjustment of the pump displacement and the motor displacement.

11 Claims, 4 Drawing Sheets

US 9,347,554 B2

HYDROSTATIC DRIVE SYSTEM

TECHNICAL FIELD

The present disclosure relates to a hydrostatic drive system and more particularly relates to a method and system for upshifting or downshifting a hydraulic motor in the hydrostatic drive system.

BACKGROUND

Hydrostatic drive system refers to a drive train or a portion of a drive train in a machine that utilizes pressurized hydraulic fluid as the motive force for propelling the work machine. In a typical design, a hydraulic pump is driven by an engine to provide the pressurized hydraulic fluid to a hydraulic motor. The hydraulic motor in turn coupled with one or more axles of the machine. Commonly, both the hydraulic pump and the hydraulic motor have a variable displacement, allowing the variation of torque and speed applied to a ground engaging members such as, wheels or tracks of the machine.

European Patent Application No. 1,008,785 discloses an automatic shifting arrangement for a hydraulic motor. A pressure sensor monitors the pressure in a working line supplying fluid from a pump to the hydraulic motor. When the pressure in the working line exceeds a pre-determined pressure for a certain time interval, a controller signals a solenoid to shift a pilot valve allowing fluid to shift a torque valve. The shifting of the torque valve allows fluid to reach cylinders which shift a swash plate controlling the hydraulic motor's speed. Conversely, if there is a reduction in pressure below a further pre-determined pressure, the controller deactivates the solenoid, whereby the pilot valve and the torque valve return to their previous positions.

SUMMARY

In one aspect, a hydrostatic drive system for a machine is disclosed. The hydrostatic drive system includes a pump, a hydraulic motor configured to receive a pressurized fluid from the pump and a controller operably connected to the pump and the hydraulic motor. The controller is configured to receive an input signal indicative of a current machine speed and a desired machine speed. Further, the controller is configured to output a motor displacement command signal and a pump displacement command signal to adjust a displacement of the hydraulic motor and the pump respectively based on the input signal to maintain at least one of a constant machine speed or constant acceleration or constant deceleration during adjustment of the pump displacement and the motor displacement.

In another aspect, a method for operating the hydrostatic drive system for a machine is disclosed. The method includes determining the current machine speed and the desired machine speed. The method further includes adjusting a displacement of the pump while maintaining at least one of a constant machine speed or constant acceleration or constant deceleration during adjusting the displacement of the hydraulic motor based on the current machine speed and the desired machine speed.

DETAILED DESCRIPTION

Figure 1:
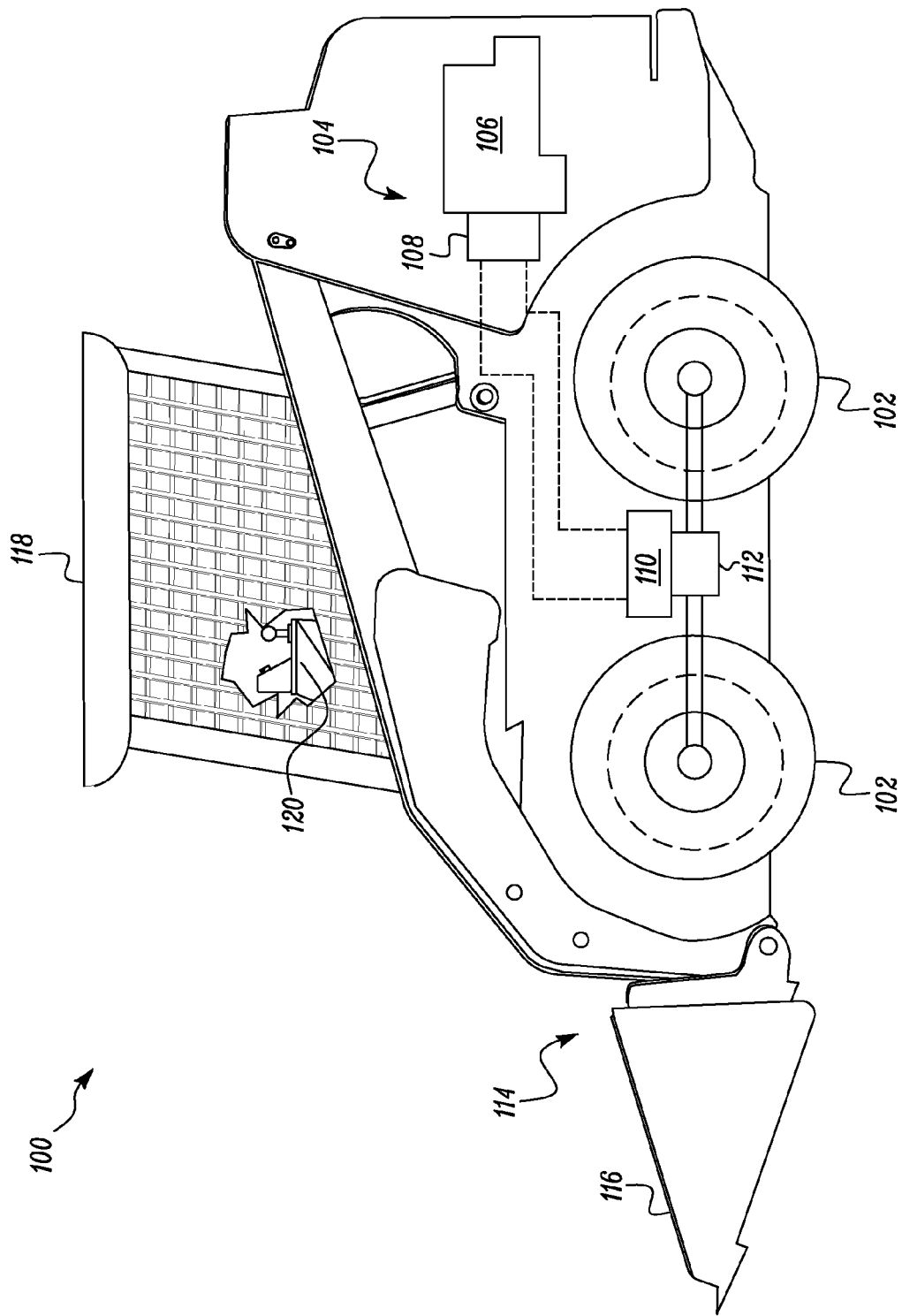
FIG. 1 is a perspective view of a machine with a hydrostatic drive system.

FIG. 1 illustrates a hydrostatic drive machine 100. The machine 100 includes ground engaging members 102 such as wheels, and a hydrostatic drive system 104 for powering the ground engaging members 102 to propel the machine 100. The hydrostatic drive system 104 may include a power source 106, a pump 108 configured to be driven by an output shaft of the power source 106, a hydraulic motor 110, and a transmission 112. Although, the machine 100 is embodied as a skid steer loader having an implement system 114 including a bucket 116, however, the machine 100 may be of any wide variety of other hydrostatic drive machines well known in the art.

The power source 106 may include an internal combustion engine, such as, for example, a diesel engine, a gasoline engine, a gaseous fuel-powered engine, or any other type of engine known in the art. Alternatively, the power source 106 may include a non-combustion source of power such as a fuel cell, a power storage device, or another source known in the art. The power source 106 may produce a mechanical or electrical power output that may be converted to hydraulic power for operating the implement system 114 and propelling the machine 100 operated by the hydrostatic drive system 104.

Further, the machine 100 includes an operator station 118, which may include one or more operator interface devices 120 to control machine speed and travel directions of the machine 100. The operator interface devices 120 may include a single or multi-axis joysticks or levers or pedals or switches, dial, a touch based interface, a voice based interface or the like, located proximal an operator seat. In an aspect of the present disclosure, the operator interface devices 120 may also include a multi-speed, momentary switch.

Figure 2:
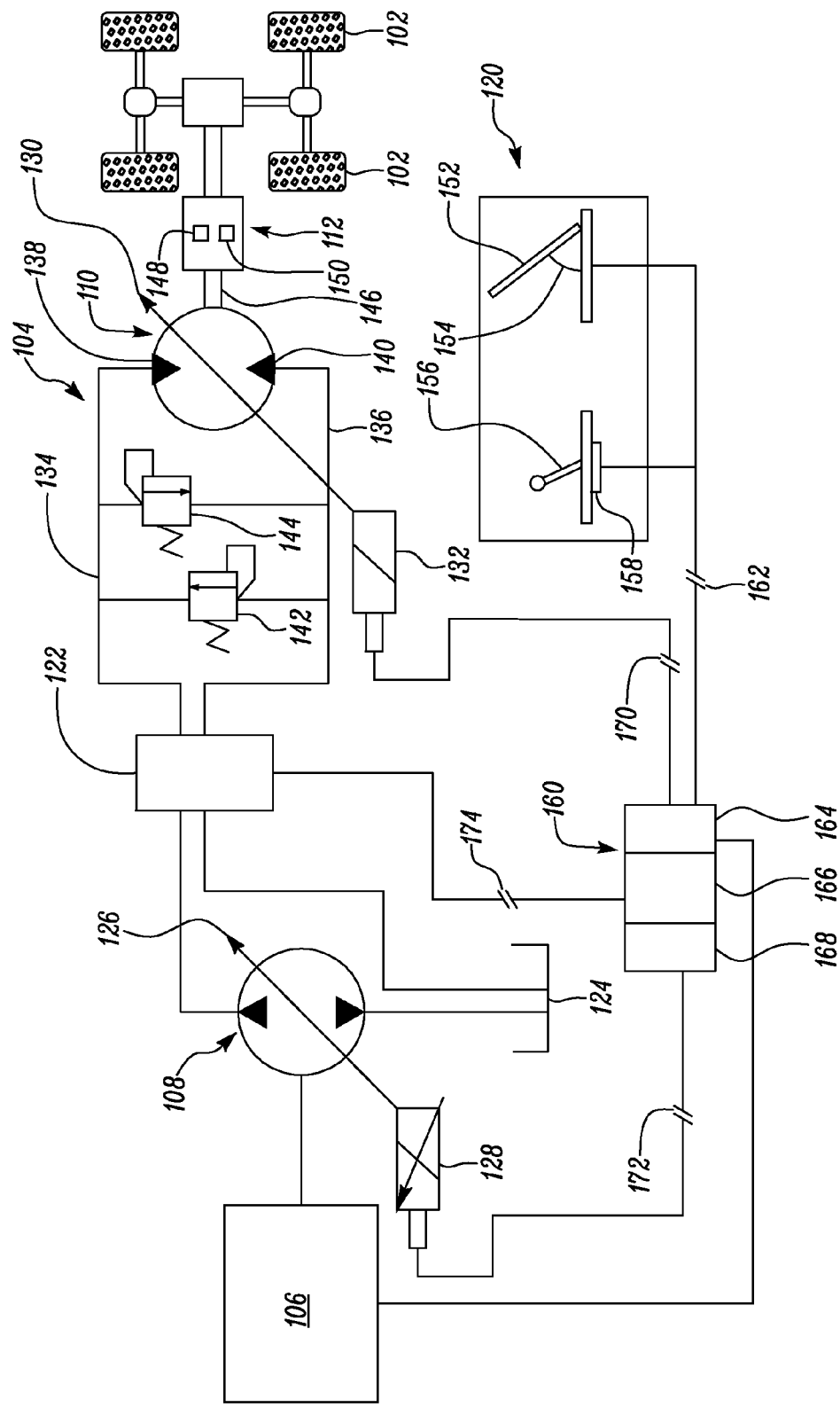
FIG. 2 illustrates a schematic view of the hydrostatic drive system.

FIG. 2 illustrates a schematic of the hydrostatic drive system 104, according to an aspect of the present disclosure. In an exemplary arrangement, the hydrostatic drive system 104 may include, among other things, a control valve 122 to selectively control a flow of pressurized fluid from the pump 108 to the hydraulic motor 110 and from the hydraulic motor 110 to a low-pressure tank 124 to propel the machine 100. The pump 108 may be a variable displacement pump of any well-known construction and type, such as, a gear pump, a rotary vane pump, a screw pump, an axial piston pump or a radial piston pump. The pump 108 may include a pump swash plate 126 connected to a first swash plate control valve 128. The first swash plate control valve 128 may be a variable solenoid valve and configured to selectively control a pump displacement of the pump 108 by adjusting an angle of the pump swash plate 126.

The hydraulic motor 110 may be a variable displacement hydraulic motor of any well-known construction and type, such as, an axial plunger motor, a gerotor motor, a gear and vane motor or a radial piston motor. The hydraulic motor 110 may include a motor swash plate 130 connected to a second swash plate control valve 132. The second swash plate control valve 132 may be a solenoid valve and configured to selectively control a motor displacement of the hydraulic motor 110 by adjusting an angle of the motor swash plate 130. In an embodiment, the hydraulic motor 110 may be a two-speed motor which is adjustable between a maximum displacement orientation and a minimum displacement orientation.

In an embodiment, the hydraulic motor 110 may be a bi-directional motor and include a first motor conduit 134 and a second motor conduit 136. In the illustrated embodiment, the first motor conduit 134 is provided between the control valve 122 and a first port 138 of the hydraulic motor 110. Further, the second motor conduit 136 is provided between the control valve 122 and a second port 140 of the hydraulic motor 110. In an aspect of the present disclosure, the control valve 122 may be directional control valve to start, stop or change the flow of the pressurized fluid and control the rotation of the hydraulic motor 110. In an embodiment, the control valve 122 may be a solenoid operated, variable position, four-way, three-position valve movable between a first working position, wherein the first port 138 is in fluid communication with the pump 108 and the second port 140 is in fluid communication with the tank 124, a second working position, wherein the first port 138 is in fluid communication with the tank 124 and the second port 140 is in fluid communication with the pump 108, and a neutral position, wherein the flow from the pump 108 to the hydraulic motor 110 is blocked. In another embodiment, the control valve 136 may include an independent metering valve (IMV) system that includes plurality of independently-operated valves.

In an embodiment, a pair of cross-line pressure relief valves 142, 144 may be provided to interconnect the first and the second motor conduits 134, 136. The pressure relief valves 142, 144 may allow an excessive pressure above a predetermined value in one of the first and second motor conduits 134, 136 to relieve to the other of the first and the second motor conduits 134, 136.

The hydraulic motor 110 in turn is coupled with the transmission 112 to transmit rotational power produced at an output shaft 146 of the hydraulic motor 110 to the ground engaging members 102 via respective differentials. The transmission 112 may embody a multi-speed, bidirectional, mechanical transmission having a neutral gear ratio, multiple forward gear ratios, and multiple reverse gear ratios. In an embodiment, the forward gear ratios may include a low speed gear 148 and a high speed gear 150.

Moreover, the operator interface devices 120 located in the operator station 118 may include a throttle pedal 152 having a throttle position sensor (TPS) 154, and a gear selector lever 156 having a lever position sensor 158. The TPS 154 and the lever position sensor 158 are configured to regulate machine speed and gear ratio settings of the transmission 112 based on an input received from an operator. As shown in FIG. 2, a controller 160 is provided to regulate the operation of the hydrostatic drive system 104. The controller 160 may be an electronic controller that may include a processor operably associated with other electronic components such as data storage devices and various communication channels. In an embodiment, the controller 160 may include a data structure to selectively engage the transmission 112 in the low speed gear 148 or the high speed gear 150 in response to an input signal 162 received from the operator interface devices 120, such as the TPS 154, and the lever position sensor 158.

The controller 160 may be operably connected to the first swash plate control valve 128, the second swash plate control valve 132, and the transmission 112 to regulate the operation of the hydrostatic drive system 104 during shifting from the low speed gear 148 to the high speed gear 150, and vice versa. The controller 160 may include a signal receiving module 164, a data storage module 166, and a processing module 168. The signal receiving module 164 may be configured to receive signals using various communication channels. The data storage module 166 may include for example, but not limited to, a Random Access Memory (RAM), a Read Only Memory (ROM), flash memory, a data structure, and the like. The data storage module 166 may store a control algorithm or a computer executable code to output a motor displacement command signal 170 and a pump displacement command signal 172 to adjust the displacement and/or rate of change in displacement of the motor swash plate 130 of the hydraulic motor 110 and the pump swash plate 126 of the pump 108, respectively, based on the input signal 162 received from the operator interface devices 120. Moreover, the data storage module 166 may also store a computer executable code to output a control signal 174 to control the flow of the pressurized fluid from the pump 108 to the hydraulic motor 110 via the control valve 122. The data storage module 166 may be operable on the processing module 168 to output the motor displacement command signal 170, the pump displacement command signal 172, and the control signal 174.

It will be apparent to a person having ordinary skill in the art that the controller 160 may include means for determining the desired machine speed and the current machine speed based at least in part based on the TPS 154, and the lever position sensor 158. During an acceleration mode, the signal receiving module 164 is configured to receive the input signal 162 indicative of the desired machine speed greater than the current machine speed. In an embodiment, during the acceleration mode the input signal 162 may be indicative of shift from the low speed gear 148 to the high speed gear 150. According to an exemplary embodiment of the present disclosure, the controller 160 is further configured to output the motor displacement command signal 170 to upshift or decrease the displacement of the motor swash plate 130 of the hydraulic motor 110 to the minimum displacement orientation corresponding to the desired machine speed. The controller 160 may further configured to output the pump displacement command signal 172 to decrease the displacement of the pump swash plate 126 of the pump 108 to maintain the current machine speed while decreasing the displacement of the motor swash plate 130 of the hydraulic motor 110. Further, once the displacement of the motor swash plate 130 of the hydraulic motor 110 is decreased, the controller 160 is further configured to output the pump displacement command signal 172 to increase the displacement of the pump swash plate 126 of the pump 108 with a constant acceleration to achieve the desired machine speed.

Moreover, during a deceleration mode, the signal receiving module 164 is configured to receive the input signal 162 indicative of the desired machine speed less than the current machine speed. In an embodiment, during the deceleration mode the input signal 162 may be indicative of shift from the high speed gear 150 to the low speed gear 148. According to an exemplary embodiment, the controller 160 is configured to output the pump displacement command signal 172 to decrease the displacement of the pump swash plate 126 of the pump 108 to achieve the desired machine speed. Once, the displacement of the pump swash plate 126 of the pump 108 is decreased and the machine 100 is at the desired machine speed, the controller 160 is further configured to output the motor displacement command signal 170 to downshift or increase the displacement of the motor swash plate 130 of the hydraulic motor 110 to the maximum displacement orientation corresponding to the desired machine speed. The controller 160 is further configured to output the pump displacement command signal 172 to increase the displacement of the pump swash plate 126 of the pump 108 with a constant deceleration to maintain the desired machine speed while increasing the displacement of the motor swash plate 130 of the hydraulic motor 110. Thus, avoids a sudden acceleration/ deceleration in the machine 100 when the motor swash plate 130 of the hydraulic motor 110 is commanded to shift displacements.

Figure 3:
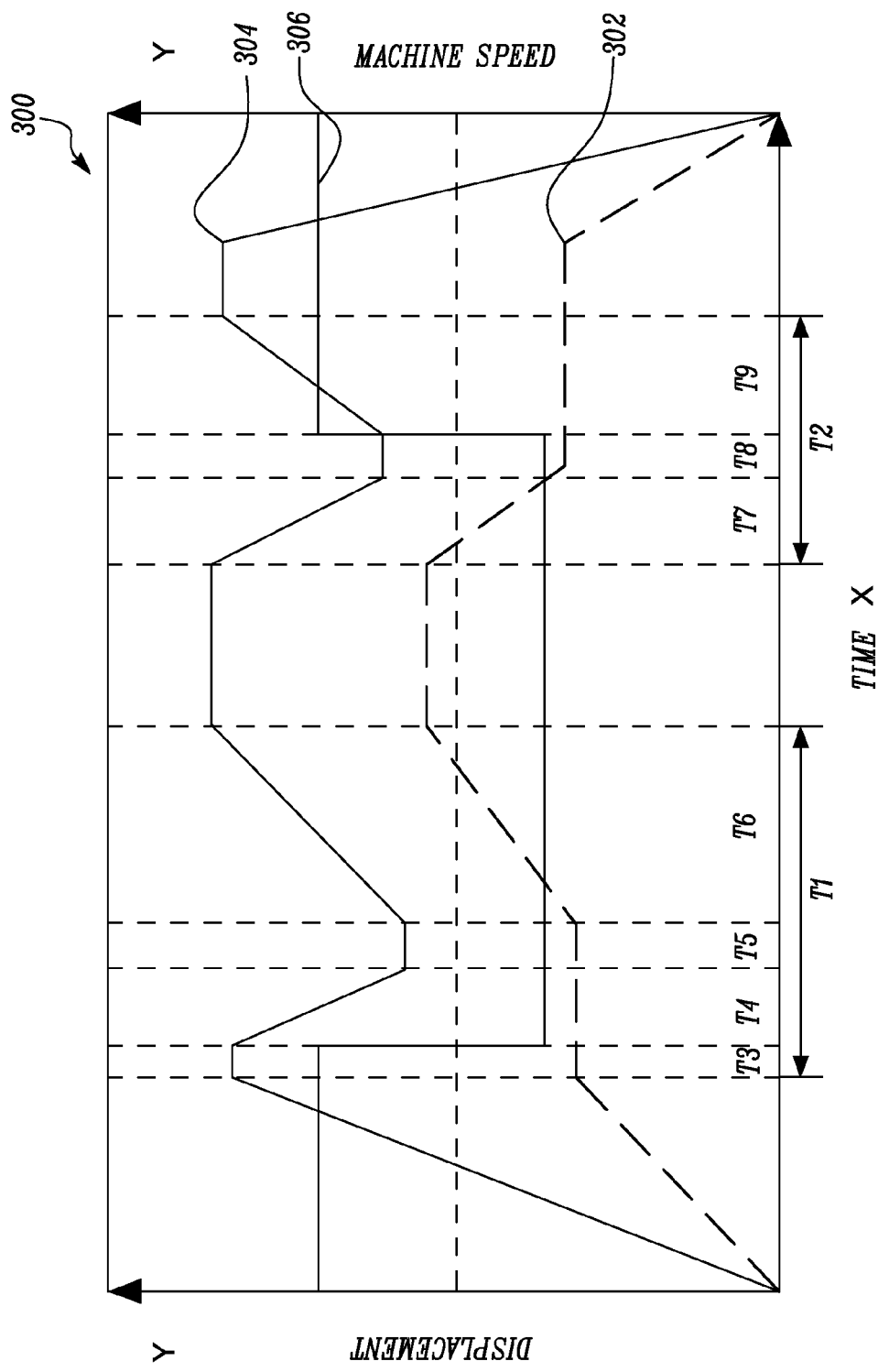
FIG. 3 illustrates a graph illustrating an acceleration mode and a deceleration mode of the machine.

FIG. 3 illustrates an exemplary graph 300 illustrating the acceleration mode and the deceleration mode, according to an aspect of the present disclosure. As illustrated in FIG. 3, Y axis (left side) represents a relative displacement of the respective swash plates 126, 130 of the pump 108 and the hydraulic motor 110, whereas X axis represents elapsed time. Further, the machine speed is also plotted along the Y axis (right side) during the acceleration mode and the deceleration mode. The graph 300 indicates a machine speed curve 302, a pump displacement curve 304, and a motor displacement curve 306.

During the acceleration mode, as illustrated in FIG. 3, the input signal 162 indicative of the of shift from the low speed gear 148 to the high speed gear 150, initiates a first time period T1. The first time period T1 represents a duration wherein the hydraulic motor 110 and the pump 108 may be adjusted to accelerate the machine 100. During the acceleration mode, for a time period T3 the pump 108 is maintained at the constant displacement may be substantially equal to an upper limit of pump displacement. Further, during a time period T4, the controller 160 may decrease the displacement of the pump swash plate 126 of the pump 108 while maintaining the constant machine speed during the upshifting or the decrease in the displacement of the motor swash plate 130 of the hydraulic motor 110. Subsequently, for a time period T5 the pump 108 is maintained at the constant displacement may be substantially equal to a lower limit of pump displacement and then the controller 160 may increase the displacement of the pump swash plate 126 of the pump 108 to proportionally increase the machine speed for a time period T6 while maintaining the constant machine acceleration.

During the deceleration mode, the input signal 162 indicative of the shift from the high speed gear 150 to the low speed gear 148, initiates a second time period T2. The second time period T2 represents a duration wherein the hydraulic motor 110 and the pump 108 may be adjusted to decelerate the machine 100. During the deceleration mode, the controller 160 may decrease the displacement of the pump swash plate 126 of the pump 108 to proportionally decrease the machine speed for a time period T7 while maintaining the constant machine deceleration. Subsequently, for a time periods T8, and T9 the pump 108 is maintained at the constant displacement may be substantially equal to a lower limit of pump displacement and then the controller 160 may increase the displacement of the pump swash plate 126 of the pump 108 while maintaining the constant machine speed during the downshifting or the increase in the displacement of the motor swash plate 130 of the hydraulic motor 110. The first time period T1 and the second time period T2 may vary, for example, depending upon the current machine speed of the machine 100, and the gear ratio between the high speed gear 150 and the low speed gear 148. For instance, where the gear ratio is relatively large, it may be desirable to accelerate or decelerate the machine 100 for a considerable length of time prior to shifting gears.

It is further contemplated that the controller 160 will be operable to electronically control all of the components of hydrostatic drive system 104, during change in displacement of the pump 108 and the hydraulic motor 110, without any input from the operator. For certain applications, however, operator may have manual control over one or more of the components of hydrostatic drive system 104. Accordingly, the operator interface devices 120 may be designed such that the input from the operator will override the controller 160.

The operator may wish to delay, interrupt or temporarily suspend the various adjustments in the hydrostatic drive system 104.

INDUSTRIAL APPLICABILITY

The industrial applicability of the method and system for upshifting or downshifting a hydraulic motor in the hydrostatic drive system herein described will be readily appreciated from the foregoing discussion. Although the machine 100 is illustrated as the skid steer loader in the present disclosure, those skilled in the art may understand that, the machine 100 may be for example, but not limited to, multi-terrain loader, compact track loader, road reclaimer, soil compactor, pneumatic compactor, cold planer, hydraulic excavator or the machine 100 might be any of a wide variety of other hydrostatic drive work machines, many of which are known in the art.

Conventionally, the hydrostatic drive system including the multi-speed motor may cause shock or jerks in the machine 100 during the acceleration mode or the deceleration mode. Thus, the sudden acceleration or deceleration may decrease efficiency of the machine 100. According to an embodiment of the present disclosure, the controller 160 may send signals to vary the displacement of the pump 108 and the hydraulic motor 110 may result in a smooth operation of the machine 100 during the acceleration mode and the deceleration mode.

Figure 4:
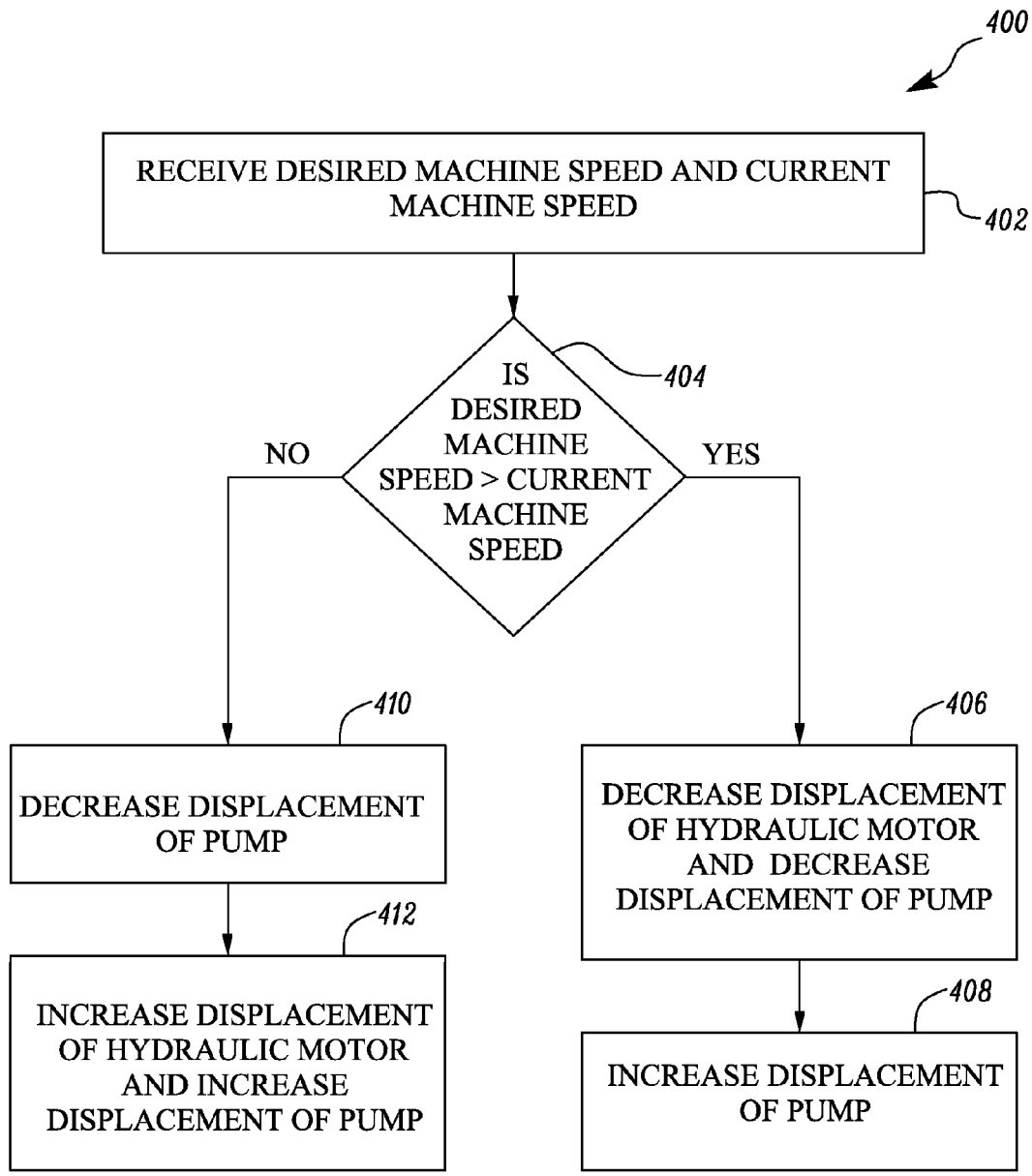
FIG. 4 illustrates a process flow chart for a method of acceleration and deceleration of the machine.

FIG. 4 illustrates a process flow chart for a method 400 for the acceleration and deceleration of the machine 100, according to an aspect of the present disclosure. At step 402, the controller 160 may receive the input signals 162 indicative of and the current machine speed. At step 404, the controller 160 may determine if the desired machine speed is greater than the current machine speed. If step 404: YES, then at step 406, the controller 160 may output the motor displacement command signal 170 to upshift or decrease the displacement of the motor swash plate 130 of the hydraulic motor 110 corresponding to the desired machine speed. The controller 160 may further output the pump displacement command signal 172 to decrease the displacement of the pump swash plate 126 of the pump 108 to maintain the current machine speed while upshifting or decreasing the displacement of the motor swash plate 130 of the hydraulic motor 110. Further, at step 408, once the displacement of the motor swash plate 130 of the hydraulic motor 110 is decreased, the controller 160 may output the pump displacement command signal 172 to increase the displacement of the pump swash plate 126 of the pump 108 to achieve the desired machine speed.

Further, if step 404: NO, at step 410, the controller 160 may output the pump displacement command signal 172 to decrease the displacement of the pump swash plate 126 of the pump 108 to achieve the desired machine speed. Once, the displacement of the pump swash plate 126 of the pump 108 is decreased and the machine 100 is at the desired machine speed, further at step 412, the controller 160 may output the motor displacement command signal 170 to downshift or increase the displacement of the motor swash plate 130 of the hydraulic motor 110 corresponding to the desired machine speed. The controller 160 may output the pump displacement command signal 172 to increase the displacement of the pump swash plate 126 of the pump 108 to achieve the desired machine speed, while downshifting or increasing the displacement of the motor swash plate 130 of the hydraulic motor 110. Thus, avoids a sudden acceleration/deceleration in the machine 100 while upshifting or downshifting of the hydraulic motor 110.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A hydrostatic drive system for a machine comprising:
   a pump;
   a hydraulic motor configured to receive a pressurized fluid from the pump; and
   a controller operably connected to the pump and the hydraulic motor, the controller configured to:
   receive an input signal indicative of a current machine speed and a desired machine speed; and
   output a motor displacement command signal and a pump displacement command signal to selectively adjust a motor displacement of the hydraulic motor and a pump displacement of the pump based on the input signal to maintain at least one of constant machine speed or constant acceleration or constant deceleration during adjustment of the pump displacement and the motor displacement, and
   wherein the controller is further configured to determine an acceleration mode, during the acceleration mode the desired machine speed is greater than the current machine speed,
   wherein during the acceleration mode, the controller is configured to:
   output the motor displacement command signal to decrease the displacement of a motor swash plate of the hydraulic motor corresponding to the desired machine speed; and
   output the pump displacement command signal to decrease the displacement of a pump swash plate of the pump to maintain the current machine speed while decreasing the displacement of the motor swash plate of the hydraulic motor to maintain the constant machine speed, and
   wherein the controller is further configured to output the pump displacement command signal to increase the displacement of the pump swash plate of the pump to achieve the desired machine speed to maintain the constant acceleration.

2. The hydrostatic drive system of claim 1, wherein the hydraulic pump is a variable displacement pump.

3. The hydrostatic drive system of claim 1, wherein the hydraulic motor is a two-speed motor.

4. The hydrostatic drive system of claim 1, wherein the controller is configured to determine a deceleration mode, during the deceleration mode the desired machine speed is less than the current machine speed.

5. The hydrostatic drive system of claim 4, wherein during the deceleration mode, the controller is configured to output the pump displacement command signal to decrease the displacement of a pump swash plate of the pump to achieve the desired machine speed.

6. The hydrostatic drive system of claim 5, wherein the controller is further configured to:
   output the motor displacement command signal to increase the displacement of a motor swash plate of the hydraulic motor corresponding to the desired machine speed; and
   output the pump displacement command signal to increase the displacement of the pump swash plate of the pump to maintain the current machine speed while increasing the displacement of the motor swash plate of the hydraulic motor to maintain the constant machine speed.

7. A machine comprising:
   at least one ground engaging member;
   a hydrostatic drive system configured to power the ground engaging member, the hydrostatic drive system comprising:
   a power source;
   a pump configured to be driven by the power source;
   a hydraulic motor configured to receive a pressurized fluid from the hydraulic pump; and
   a controller electrically connected to the pump and the hydraulic motor, the controller configured to:
   receive an input signal indicative of a current machine speed and a desired machine speed; and
   output a motor displacement command signal and a pump displacement command signal to selectively adjust a motor displacement of the hydraulic motor and a pump displacement of the pump based on the input signal to maintain at least one of constant machine speed or constant acceleration or constant deceleration during adjustment of the pump displacement and the motor displacement, and
   wherein the controller is further configured to determine an acceleration mode, during the acceleration mode the desired machine speed is greater than the current machine speed,
   wherein during the acceleration mode, the controller is configured to:
   output the motor displacement command signal to decrease the displacement of a motor swash plate of the hydraulic motor corresponding to the desired machine speed; and
   output the pump displacement command signal to decrease the displacement of a pump swash plate of the pump to maintain the current machine speed while decreasing the displacement of the motor swash plate of the hydraulic motor to maintain the constant machine speed, and
   wherein the controller is further configured to output the pump displacement command signal to increase the displacement of the pump swash plate of the pump to achieve the desired machine speed to maintain the constant acceleration.

8. The machine of claim 7, wherein the hydraulic pump is a variable displacement pump and the hydraulic motor is a two-speed motor.

9. The machine of claim 7, wherein the controller is configured to determine a deceleration mode, during the deceleration mode the desired machine speed is less than the current machine speed.

10. The machine of claim 9, wherein during the deceleration mode, the controller is configured to output the pump displacement command signal to decrease the displacement of a pump swash plate of the pump to achieve the desired machine speed.

11. The machine of claim 10, wherein the controller is further configured to:
- output the motor displacement command signal to increase the displacement of a motor swash plate of the hydraulic motor corresponding to the desired machine speed; and
- output the pump displacement command signal to increase the displacement of the pump swash plate of the pump to maintain the current machine speed while increasing the displacement of the motor swash plate of the hydraulic motor to maintain the constant machine speed.

\* \* \* \* \*